United States Patent
Okayasu et al.

(10) Patent No.: US 9,644,482 B2
(45) Date of Patent: May 9, 2017

(54) METHOD FOR MANUFACTURING MACHINE COMPONENT, AND ROTARY MACHINE EQUIPPED WITH IMPELLER MANUFACTURED BY MEANS OF THIS METHOD

(71) Applicant: MITSUBISHI HEAVY INDUSTRIES, LTD., Tokyo (JP)

(72) Inventors: Shimpei Okayasu, Tokyo (JP); Hiroko Kitamoto, Tokyo (JP); Daisuke Kawanishi, Tokyo (JP); Hiroki Takagi, Tokyo (JP); Nobuyori Yagi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 727 days.

(21) Appl. No.: 14/123,269

(22) PCT Filed: Dec. 20, 2012

(86) PCT No.: PCT/JP2012/083016
§ 371 (c)(1),
(2) Date: Dec. 2, 2013

(87) PCT Pub. No.: WO2013/094670
PCT Pub. Date: Jun. 27, 2013

(65) Prior Publication Data
US 2014/0105751 A1    Apr. 17, 2014

(30) Foreign Application Priority Data

Dec. 22, 2011 (JP) ................................. 2011-281606

(51) Int. Cl.
*F01D 1/18* (2006.01)
*F04D 29/02* (2006.01)
(Continued)

(52) U.S. Cl.
CPC .............. *F01D 1/18* (2013.01); *B23P 15/006* (2013.01); *C21D 1/30* (2013.01); *C21D 11/00* (2013.01);
(Continued)

(58) Field of Classification Search
CPC .... F04D 29/023; F04D 29/281; B23P 15/006; F01D 1/18; F05D 2230/10;
(Continued)

(56) References Cited

U.S. PATENT DOCUMENTS 4,428,717 A * 1/1984 Catterfeld ................. F04D 7/04
29/889.4
5,573,374 A * 11/1996 Giberson .............. B23P 15/006
416/186 R (Continued)

FOREIGN PATENT DOCUMENTS

CN      1549871       11/2004
JP      2004-092650    3/2004
(Continued)

OTHER PUBLICATIONS

Chinese Office Action issued Jun. 30, 2015 in corresponding Chinese Patent Application No. 201280019908.6 with English translation.
(Continued)

*Primary Examiner* — Igor Kershteyn
(74) *Attorney, Agent, or Firm* — Wenderoth, Lind & Ponack, L.L.P.

(57) ABSTRACT

A method for manufacturing a machine component includes a process of estimating post-heat-treatment strength for the intermediate form of a base material after a certain mechanical working process is performed, and a process of comparing the estimated strength with reference strength required for a final form. According to a result of the comparison,
(Continued)

heat treatment of the base material is performed after one of the mechanical working processes is performed.

10 Claims, 11 Drawing Sheets

(51) Int. Cl.
  *F04D 29/28* (2006.01)
  *B23P 15/00* (2006.01)
  *C21D 11/00* (2006.01)
  *C21D 1/30* (2006.01)
(52) U.S. Cl.
  CPC ......... *F04D 29/023* (2013.01); *F04D 29/281* (2013.01); *C21D 2261/00* (2013.01); *F05D 2230/10* (2013.01); *F05D 2230/40* (2013.01); *Y10T 29/49764* (2015.01)
(58) Field of Classification Search
  CPC ....... F05D 2230/40; C21D 1/30; C21D 11/00; C21D 2261/00; Y10T 29/49764
  See application file for complete search history.

(56) References Cited

U.S. PATENT DOCUMENTS

| | | | | |
|---|---|---|---|---|
| 5,593,085 A | * | 1/1997 | Tohill | B23P 15/006 228/103 |
| 7,273,352 B2 | * | 9/2007 | Williams | F04D 29/2294 416/175 |
| 7,628,586 B2 | * | 12/2009 | Feher | B23P 15/006 415/170.1 |
| 2004/0093727 A1 | | 5/2004 | Mola | |
| 2005/0127138 A1 | | 6/2005 | Bacon et al. | |

FOREIGN PATENT DOCUMENTS

| | | |
|---|---|---|
| JP | 2009-92064 | 4/2009 |
| JP | 2009-156122 | 7/2009 |
| JP | 2010-230012 | 10/2010 |
| JP | 2011-241704 | 12/2011 |
| WO | 2011/142423 | 11/2011 |

OTHER PUBLICATIONS

Extended European Search Report issued Apr. 20, 2015 in corresponding European Patent Application No. 12859468.6.

International Search Report issued Feb. 19, 2013 in International (PCT) Application No. PCT/JP2012/083016 with English translation.

Written Opinion of the International Searching Authority issued Feb. 19, 2013 in International (PCT) Application No. PCT/JP2012/083016 with English translation.

* cited by examiner

METHOD FOR MANUFACTURING MACHINE COMPONENT, AND ROTARY MACHINE EQUIPPED WITH IMPELLER MANUFACTURED BY MEANS OF THIS METHOD

TECHNICAL FIELD

The present invention relates to a method for manufacturing a machine component, capable of determining based on simulation whether or not strength-related data (yield strength, hardness, etc.) predicted from the thickness of a base material such as an impeller material (machine component) meets required specifications, performing heat treatment of quenching and tempering based on results of the determination, and minimizing deformation of the base material in the event of heat treatment, and relates to a rotary machine equipped with an impeller manufactured by means of this method.

Priority is claimed on Japanese Patent Application No. 2011-281606, filed on Dec. 22, 2011, the content of which is incorporated herein by reference.

BACKGROUND ART

Conventionally, as an impeller used in a rotary machine such as a compressor, a welded impeller is known.

For example, as shown in FIGS. 10A and 10B, a welded impeller 10 formed in one body by mutually welding constituent members such as a cover 1, blades 2, and a disc 3 (showing weld zones with a symbol 4) is known.

Thus, such a welded impeller 10 is manufactured, as shown in FIG. 11, by independently preparing the cover (shroud) 1, the blades 2, and the disc (hub) 3 (S1), integrally forming these constituent members by weld zones 4 (S2), performing heat treatment such as quenching and tempering for the purpose of removing residual stress after the welding and enhancing hardness and durability (S3), performing finishing using mechanical working and electrical discharge machining (S4), and then performing trimming and polishing using electrolytic polishing and chemical polishing (S5).

In recent years, the impeller has made progress toward high efficiency and high performance, and a shape thereof has necessarily become complicated, diversified, and increased in precision. In the case of the welded impeller, the heat treatment such as quenching and tempering for the purpose of removing residual stress after the welding and enhancing hardness and durability is performed (S3), but during the welding (S2) and the heat treatment (S3), deformation occurs leading to the possibility of dimensional precision being reduced.

For this reason, for the purpose of reducing the deformation caused by the welding and the heat treatment and improving the dimensional precision, for example, as disclosed in Japanese Unexamined Patent Application, First Publication Nos. 2004-92650, 2009-156122, and 2010-230012, an integrated impeller (denoted by a symbol 11) integrally forming the cover, the blades, and the disc without being welded is provided.

In the integrated impeller 11 disclosed in these Patent Literatures, as shown in FIGS. 12A and 12B, a cover (shroud) 5, blades 6, and a disc (hub) 7, which are main components, are manufactured from a metal serving as a base metal in a predetermined shape by mechanical working and electrical discharge machining, and are free from deformation caused by the welding. For this reason, a precise shape for obtaining desired performance as the impeller can be obtained, and no defects associated with the welding occur.

Thus, the integrated impeller 11 is manufactured, as shown in FIG. 13, by preparing the cover (shroud) 5, the blades 6, and the disc (hub) 7 from a material made of one block by means of cutting (S6), performing heat treatment for the purpose of hardening a surface and improving toughness (S7), performing finishing using mechanical working and electrical discharge machining (S8), and then performing trimming and polishing using electrolytic polishing and chemical polishing (S9).

CITATION LIST

Patent Literature

[Patent Literature 1]
 Japanese Unexamined Patent Application, First Publication No. 2004-92650
[Patent Literature 2]
 Japanese Unexamined Patent Application, First Publication No. 2009-156122
[Patent Literature 3]
 Japanese Unexamined Patent Application, First Publication No. 2010-230012

SUMMARY OF INVENTION

Problem to be Solved by the Invention

However, even in the case of the integrated impeller disclosed in Patent Literatures 1 to 3 above, since the heat treatment such as quenching and temperature for the purpose of enhancing the durability, the deformation occurs during the heat treatment. Such deformation cannot always be predicted in advance. In this respect, there is room for further improvement of the dimensional precision.

To be specific, in the integrated impeller, the process of hardening the surface to improve toughness by performing the heat treatment after the mechanical working is performed. However, in the state of the base metal (metal block) before the mechanical working, as shown in FIG. 14, a central portion C located in the center (portion at which a cooling rate is slow) is distant from the surface. As such, a quenching effect is unachievable, and the strength has a tendency to be lowered. During such heat treatment, when a deformation that is not predictable occurs, a process of finishing such as grinding after the heat treatment may be required again to obtain desired dimensional precision.

The present invention has been made in consideration of these circumstances, and an object of the present invention is to provide a method for manufacturing a machine component, capable of predicting strength in the event of heat treatment such as quenching and tempering to thereby reduce an amount of deformation of a base material to optimize a form in the event of the heat treatment, and improving performance of the machine component (impeller) used in a rotary machine, and a rotary machine equipped with an impeller manufactured by this method.

Means for Solving the Problem

In order to solve the aforementioned problems, the present invention proposes the following means. According to a first aspect of the present invention, there is provided a method for manufacturing a machine component, in which a base material is subjected to a plurality of mechanical working processes and heat treatment processes and is processed into a final form. The method includes: a process of calculating and estimating post-heat-treatment strength for an intermediate form of the base material after one of the mechanical working processes is performed; and a process of comparing the estimated strength with reference strength required for the final form. According to a result of the comparison, heat treatment is performed after one of the mechanical working processes is performed.

According to the aspect, the process of estimating the post-heat-treatment strength for the intermediate form of the base material after one of the mechanical working processes is performed, and the process of comparing the estimated strength with the reference strength required for the final form are provided. According to the result of the comparison, the heat treatment of the base material is performed after one of the mechanical working processes is performed. Thereby, when the result of the comparison indicates that the post-heat-treatment strength estimated for the intermediate form of the base material after the mechanical working processes does not meet the reference strength required for the final form, processing of, for instance, changing the form of the base material is performed. Thereby, required strength of the base material can be secured. That is, by reducing an amount of deformation of the base material in the event of the heat treatment to optimize the form in the event of the heat treatment, performance of the machine component (impeller) used in a rotary machine can be improved.

Further, according to a second aspect of the present invention, in the method for manufacturing the machine component relating to the first aspect of the present invention, finishing (mechanical working or electrical discharge machining) is performed after the heat treatment process.

According to the aspect, by performing the finishing after the heat treatment process, the base material hardened by quenching can be finished in the final form with a minimum amount of machining.

Further, according to a third aspect of the present invention, in the method for manufacturing the machine component relating to the first or second aspect of the present invention, the comparing process includes adjusting a thickness of the base material when the estimated strength does not meet the reference strength required for the final form.

Further, according to a fourth aspect of the present invention, in the method for manufacturing the machine component relating to the third aspect of the present invention, the comparing process includes forming the base material in a cylindrical form, in the center of which an opening is formed, when the estimated strength does not meet the reference strength required for the final form.

Further, according to a fifth aspect of the present invention, in the method for manufacturing the machine component relating to the fourth aspect of the present invention, the comparing process includes forming a cover profile on an outer surface of the base material formed in the cylindrical form when the estimated strength does not meet the reference strength required for the final form.

Further, according to a sixth aspect of the present invention, in the method for manufacturing the machine component relating to the fifth aspect of the present invention, the comparing process includes forming flow paths in the base material on which the cover profile is formed when the estimated strength does not meet the reference strength required for the final form.

According to the aspects, in the comparing process, when the estimated strength does not meet the reference strength required for the final form, various form changing processes of adjusting the thickness of the base material, forming the base material in the cylindrical form, in the center of which the opening is formed, forming the cover profile on the outer surface of the base material of the cylindrical form, and forming the flow paths in the base material on which the blades are formed are performed. Thereby, the required strength of the base material can be reliably secured. That is, by appropriately changing the form of the base material, the form in the event of the heat treatment can be optimized so that hardening of the heat treatment is reliably reached to the central portion of the base material in the event of the heat treatment, and the performance of the machine component (impeller) used in the rotary machine can be improved.

Further, according to a rotary machine relating to a seventh aspect of the present invention, the rotary machine includes the impeller that is the machine component manufactured by the method relating to any one of the aspects, and a driving shaft that drives the impeller.

According to the aspect, a high-powered impeller manufactured by the manufacturing method is installed on the rotary machine such as a compressor. Thereby, a quality of the entire rotary machine can be improved.

Effects of the Invention

According to the aspects, the process of estimating the post-heat-treatment strength for the intermediate form of the base material after a mechanical working process is performed, and the process of comparing the estimated strength with the reference strength required for the final form are provided. According to the result of the comparison, the heat treatment of the base material is performed after a mechanical working process is performed. Thereby, when the result of the comparison indicates that the post-heat-treatment strength estimated for the intermediate form of the base material after the mechanical working processes does not meet the reference strength required for the final form, processing of, for instance, changing the form of the base material is performed. Thereby, the required strength of the base material can be secured. That is, by reducing the amount of deformation of the base material in the event of the heat treatment to optimize the form in the event of the heat treatment, the performance of the machine component (impeller) used in the rotary machine can be improved.

DESCRIPTION OF EMBODIMENTS

First Embodiment

A first embodiment of the present invention will be described with reference to FIGS. 1 to 6.

Figure 1:
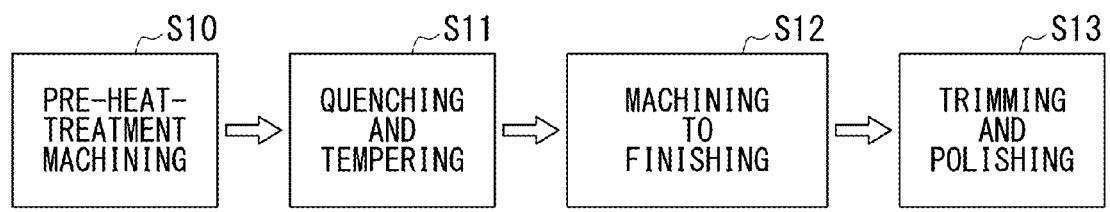
FIG. 1 is a process diagram schematically showing processes relating to a first embodiment of the present invention.
Figure 2:
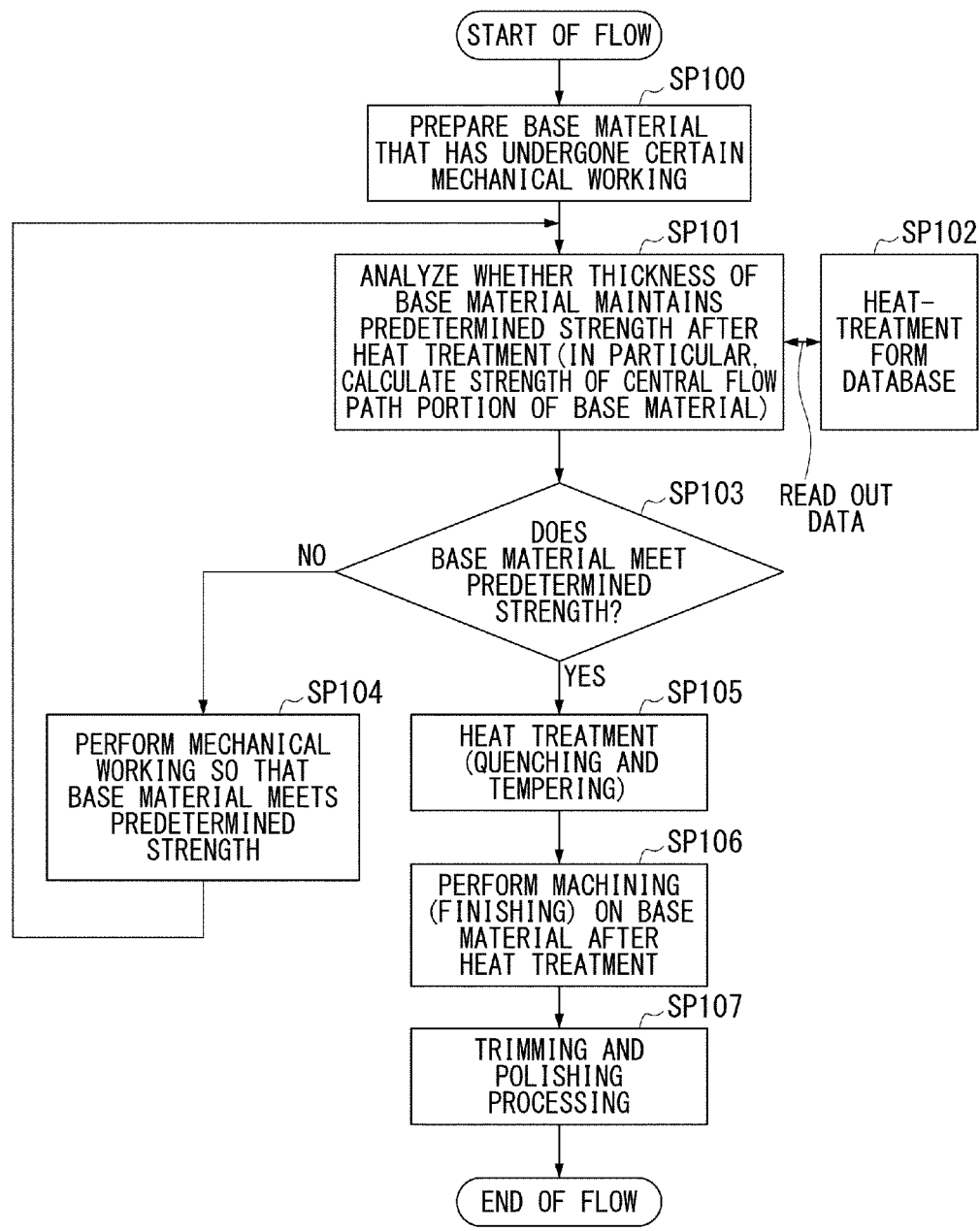
FIG. 2 is a flowchart specifically showing the processes (S10 to S13) of FIG. 1.

FIG. 1 is a process diagram schematically showing processes relating to a first embodiment of the present invention that shows timing of heat treatment in the present embodiment. FIG. 2 is a flowchart specifically showing the processes S10 to S13 of FIG. 1.

The processes relating to the first embodiment of the present invention are carried out in the sequence shown in FIG. 1. First, an impeller material (base material) that has undergone certain mechanical working is prepared (S10). As the present mechanical working, cutting from a block of a solid material is illustrated. Further, as the base material, a metal block having, for example, a short column form or a truncated cone form is illustrated. To provide a prescribed strength to this base material, heat treatment is performed based on conditions estimated by simulation (S11). Afterwards, finishing of forming a cover (shroud), blades, and a disc (hub) from the base material by means of cutting using mechanical working and electrical discharge machining (S12), and trimming and polishing using electrolytic polishing and chemical polishing (S13) are performed.

In the processes relating to the first embodiment of the present invention, to reduce an amount of deformation during heat treatment to improve dimensional precision of a final form, heat treatment such as quenching and tempering is performed without changing a form of the material before flow path machining and profile machining are performed. In other words, prior to cutting forms of the cover, the disc, and the blades, the heat treatment is performed to make required material properties, thereby minimizing an influence which heat treatment deformation exerts on the final form.

Figure 14:
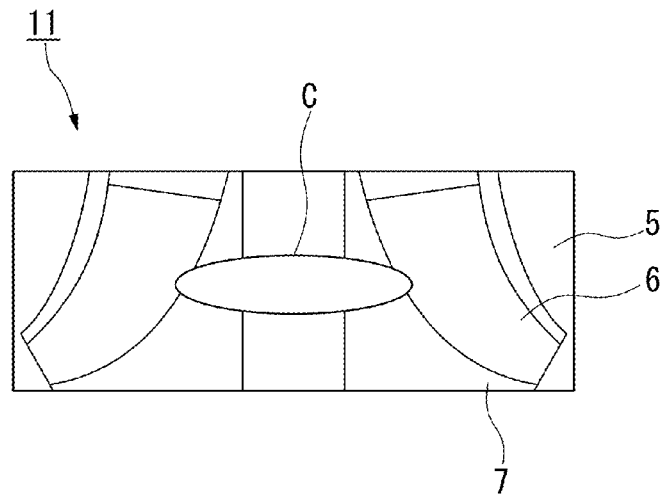
FIG. 14 is an explanatory diagram showing a central portion of the impeller having poor quenchability.

However, as shown in FIG. 14, since the base material itself has a thick wall thickness in the event of heat treatment compared to a conventional method, heat treatability of a central portion C may be deteriorated, and a required strength may not be secured. In particular, high hardness and high strength are required at surface-adjacent portions of the cover, the blades, and the disc that form a flow path. However, depending on the form of the base material, the surface-adjacent portions and the central portion C of the base material may overlap. For this reason, first, there is a need to obtain conditions for obtaining prescribed strength after the heat treatment.

Hereinafter, the aforementioned processes S10 to S13 of FIG. 1 will be described in detail with reference to the flowchart of FIG. 2.

[SP100]

Figure 3:
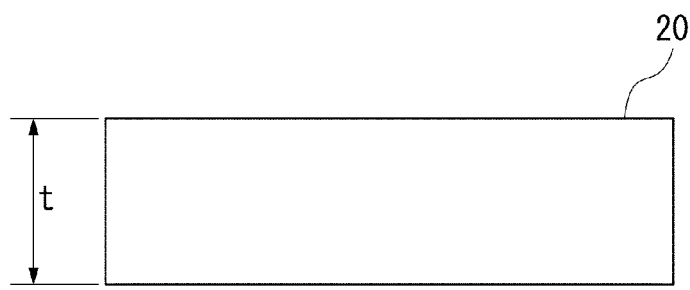
FIG. 3 is a diagram showing a base material having a column form of a thickness (t) used for machining of the first embodiment of the present invention.

First, an impeller material undergoing a certain mechanical working process is prepared. Here, a columnar base material (column material) 20 having a thickness t as shown in FIG. 3 is assumed.

[SP101] and [SP102]

Figure 4:
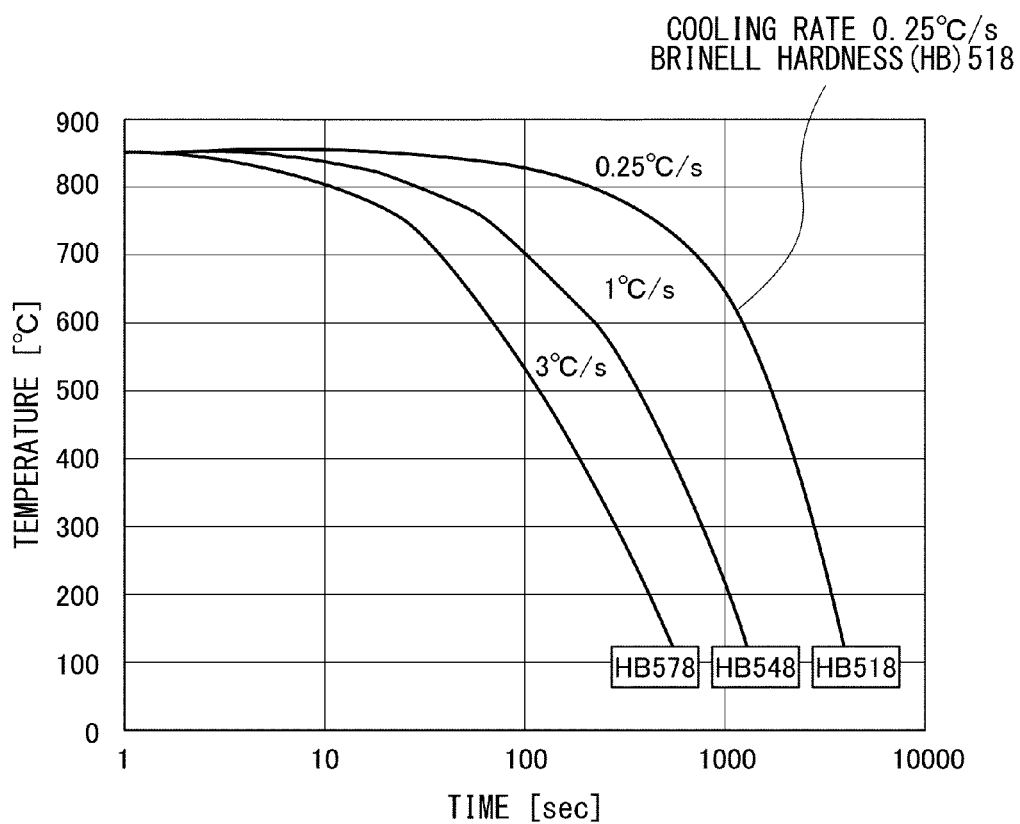
FIG. 4 is a graph showing a continuous cooling transformation curve (CCT curve) showing a relation between cooling temperature, cooling time and hardness of the base material.
Figure 5:
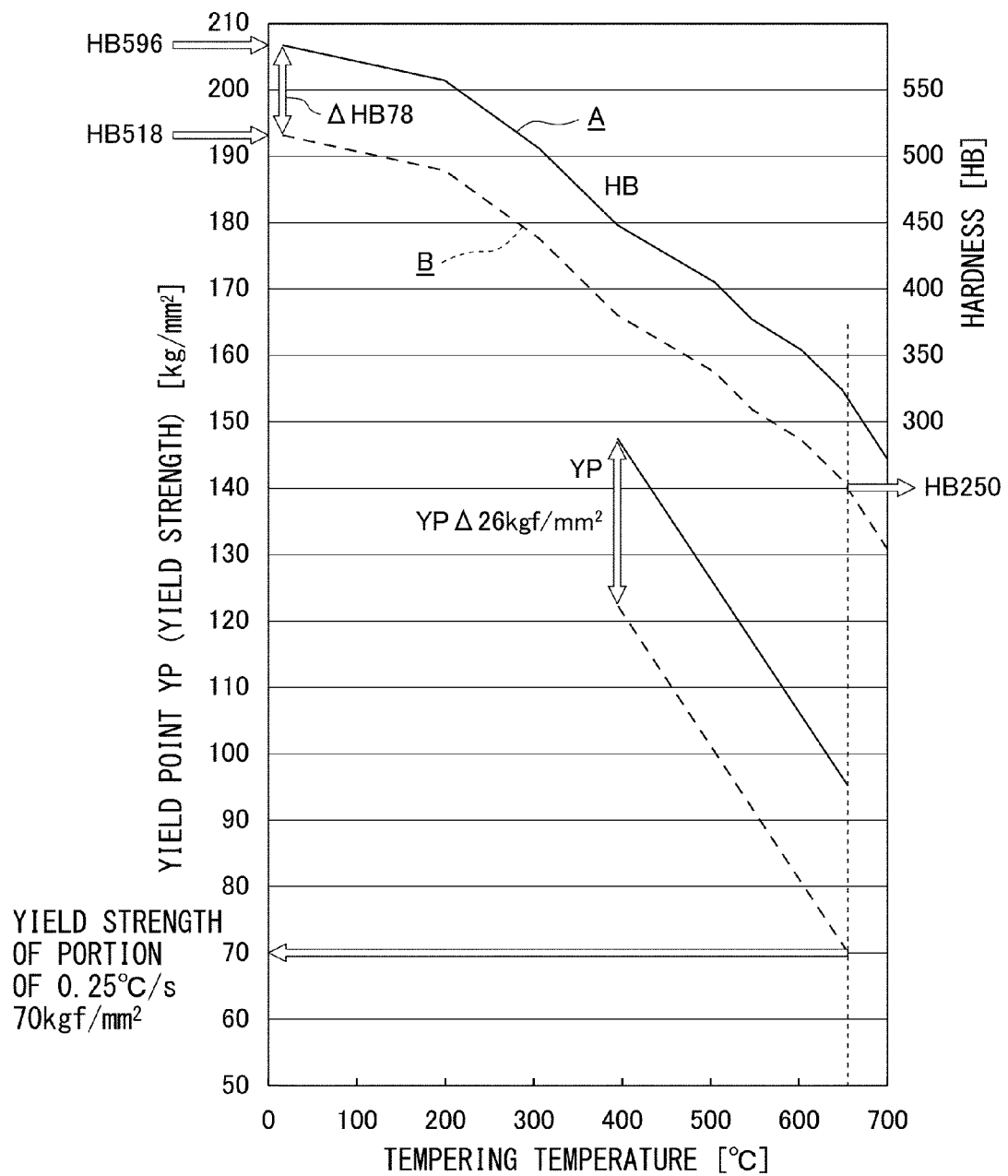
FIG. 5 is a graph showing a tempering performance curve used to determine strength of the base material.
Figure 6:
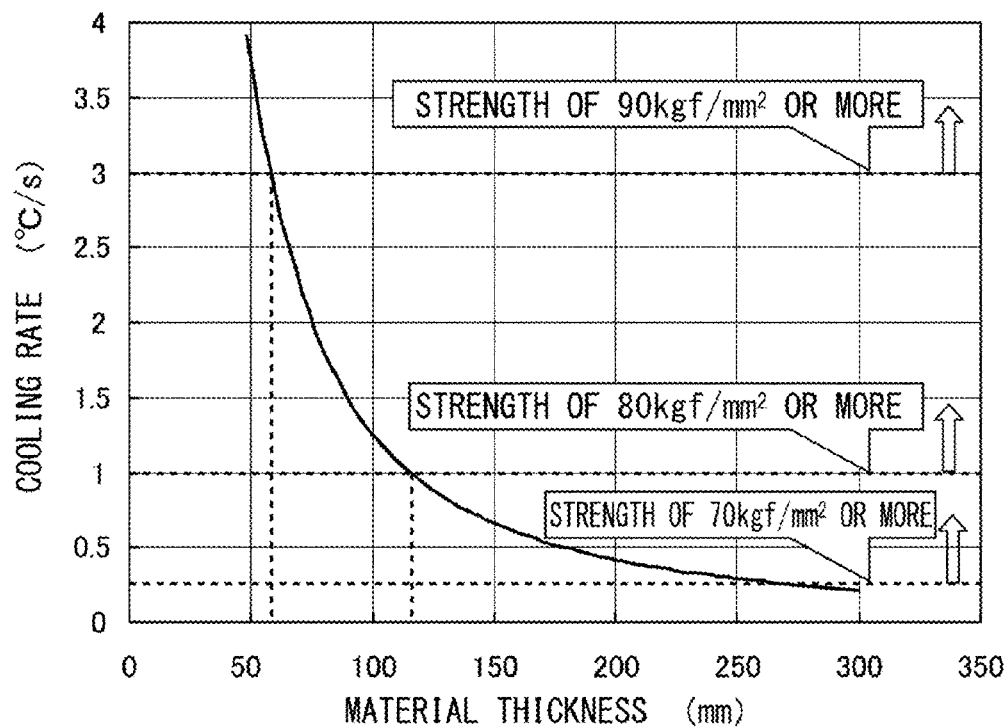
FIG. 6 is a graph showing a relation between yield strength of a base material central portion, a cooling rate, and a thickness of the base material.

Next, a calculation is made using FIGS. 4 to 6 on the assumption that heat treatment is performed on the base material 20.

A thickness of the impeller material is set based on a target form of an impeller, and a cooling rate in the event of quenching is decided by a thickness of the impeller. In general, hardness and strength (yield strength) after the heat treatment are correlated with the cooling rate in the event of quenching. As the cooling rate increases, the hardness and strength of a material become high. The hardness and strength can be predicted using a continuous cooling transformation curve (CCT curve) shown in FIG. 4 and a tempering performance curve shown in FIG. 5.

For example, in the CCT curve of FIG. 4, it is shown that Brinell hardness (HB) when the base material is cooled at 0.25° C./sec becomes 518. When this is calculated by a difference from a reference line A showing the Brinell hardness (HB) with reference to the tempering curve of FIG. 5, the Brinell hardness (HB) when tempering is performed at 650° C. is 250. In this case, it can be understood that yield strength (YP) is about 70 kgf/mm$^2$ by a difference from a reference line B. A hardness difference (ΔHB78) from the reference line A of the Brinell hardness (HB) corresponds to a strength difference (Δ26 kgf/mm$^2$) from the reference line B of the yield strength (YP), and a calculation is made based on this.

In the case in which the tempering is performed at 650° C., the yield strength (YP) of the base material central portion which is obtained in this way is arranged from a relation between the cooling rate (° C./sec) and the thickness t (mm) of the base material 20, which is shown in FIG. 6.

Then, as can be seen with reference to FIG. 6, as the thickness of the base material increases, the cooling rate of the central portion C is reduced. It is found that strength-related data (yield strength, hardness, etc.) achieved accordingly is also reduced. To be specific, when yield strength of 90 kgf/mm$^2$ is sought, the base material thickness t needs to be less than or equal to about 60 mm, and the cooling rate needs to be greater than or equal to 3° C./sec. Similarly, when yield strength of 80 kgf/mm$^2$ is sought, the base material thickness t needs to be less than or equal to about 120 mm, and the cooling rate needs to be greater than or equal to 1° C./sec.

In connection with the aforementioned cooling rate in the event of quenching, the cooling rate may be estimated using a method of evaluating the cooling rate with the aid of, for instance, a numerical simulation technique, or a method of directly measuring the cooling rate based on a test.

Therefore, it is possible to obtain the material thickness corresponding to the required strength and to design the material form in the event of heat treatment using the CCT curve of FIG. 4, the tempering curve of FIG. 5, and the cooling rate of FIG. 6. A relation between the thickness of the impeller material, the cooling rate and the attained strength may be arranged according to specifications (heating and cooling capabilities) of heat treatment equipment and manufacturing situations.

The aforementioned graphs of FIGS. 4 to 6 are stored in a database and are read out of the database as needed (SP102).

[SP103]

It is determined based on the analysis result in SP101 above whether the prepared base material 20 having the thickness t in SP100 has a predetermined strength after the heat treatment. In the case of NO, the process proceeds to SP104, and in the case of YES, the process proceeds to SP105.

[SP104]

After the mechanical working of, for instance, changing the thickness t of the base material 20 is performed based on the analysis result in SP101 (after a change in specification of, for instance, reducing the thickness of the base material 20 or changing to a thin material according to circumstances is performed), the process returns to SP101, and the strength of the base material after the heat treatment is estimated.

[SP105]

On condition that the strength estimated in SP101 is met, the heat treatment of the base material 20 is performed.

[SP106]

Mechanical working of, for instance, cutting the base material 20 heat-treated in SP105 in a given form, and finishing processing are performed. Here, in addition to the typical mechanical working, electrical discharge machining capable of efficiently machining the base material 20 whose hardness is increased is used.

[SP107]

Trimming and polishing processing of, for instance, performing electrolytic polishing and chemical polishing is performed on the base material 20 machined in SP106.

As specifically described above, the method for manufacturing the machine component shown in the first embodiment has the processes SP100 to SP102 of estimating post-heat-treatment strength for an intermediate form of the base material 20 after a certain mechanical working process, and the processes SP103 and SP104 of comparing the estimated strength with the required strength for the final form. According to the result of the comparison, the heat treatment of the base material 20 is performed after one of the aforementioned mechanical working processes (SP105 to SP107). Thereby, when the result of the comparison shows that the estimated post-heat-treatment strength for the intermediate form of the base material 20 after the mechanical working process does not meet the required strength for the final form, processing of, for instance, changing the form of the base material 20 is performed (SP104). Thereby, the required strength of the base material 20 can be secured. In other words, by reducing an amount of deformation of the base material 20 in the event of the heat treatment to optimize the form in the event of the heat treatment, it is possible to improve the performance of the machine component (impeller) used in the rotary machine.

Further, in the method for manufacturing the machine component shown in the first embodiment, the electrical discharge machining is performed after the heat treatment process (SP105), and thereby even the base material 20 whose strength is increased can be easily machined.

Second Embodiment

A second embodiment of the present invention will be described with reference to FIGS. 7A to 8.

In the aforementioned first embodiment, the mechanical working of, for instance, changing the thickness t of the base material 20 based on the analysis result of SP101 is performed in SP104. In the second embodiment, in addition to the thickness t of the base material 20, appropriate rough processing is performed depending on the thickness of the base material 20, and the overall form of the base material 20 is changed. Thereby, the heat treatment form is optimized.

Figure 7A:
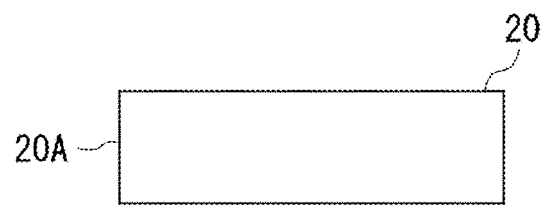
FIG. 7A is a diagram showing a form of the base material that shows a columnar base material.
Figure 7B:
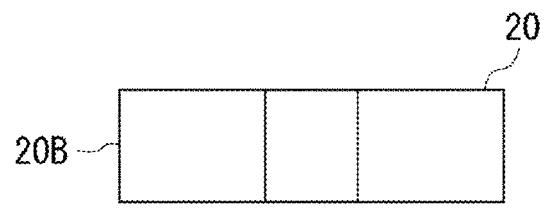
FIG. 7B is a diagram showing a form of the base material that shows a cylindrical base material.
Figure 7C:
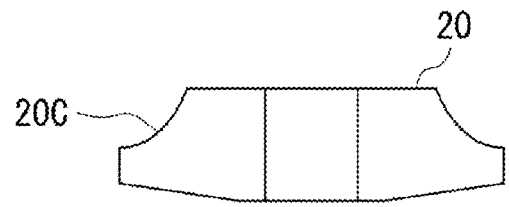
FIG. 7C is a diagram showing a form of the base material that shows a cylindrical base material in which a cover profile is formed.

To be specific, an initial form of the base material 20 is, as shown in FIG. 7A, a columnar block form (column material denoted by a symbol 20A). When it is estimated by this form that the post-heat-treatment strength is insufficient, for example, rough processing (shaft hole drilling) is performed as pre-heat-treatment machining, as shown in FIG. 7B, so as to become a cylindrical shape (denoted by a symbol 20B) in which a shaft hole is formed in the center of the impeller material. Further, when it is estimated by this cylindrical shape (denoted by the symbol 20B) that the post-heat-treatment strength is insufficient, rough processing (profile machining) is performed, as shown in FIG. 7C, in a cylindrical shape (denoted by a symbol 20C) obtained by forming a cover profile on an outer surface of the base material 20 in the center of which an opening is formed. Thereby, the cooling rate in the event of the heat treatment is increased, and the strength of the base material 20 is improved.

Figure 8:
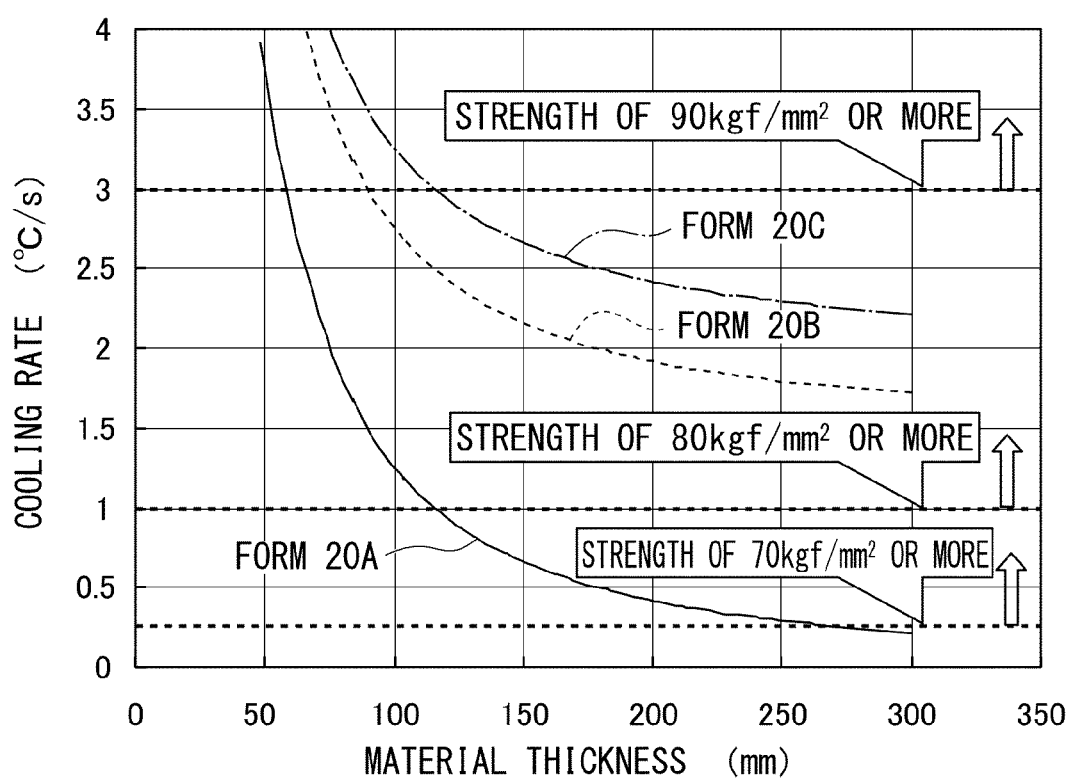
FIG. 8 is a graph showing a relation between yield strength of a base material central portion, a cooling rate, and a thickness of a base material in accordance with a second embodiment of the present invention.

Further, one of the form 20A to 20C in which the base material 20 is formed in SP104 is decided from the graph showing a relation between the cooling rate and the material thickness of each of the forms 20A to 20C shown in FIG. 8.

For example, depending on the required strengths 70, 80, and 90 kgf/mm$^2$, the forms 20A to 20C are selected, and the material thickness corresponding to the set cooling rate (3° C./sec in the present embodiment) is decided from the graph showing the relation between the cooling rate and the material thickness of each of the forms 20A to 20C" corresponding to the selected form.

In detail, when the cooling rate is set to 3° C./sec, the material thickness that can only be about 60 mm in the form 20A can be selected up to about 85 mm if the form 20B is set, and up to 120 mm if the form 20C is set.

In this way, in the second embodiment, the processing of changing to one of the forms 20A to 20C depending on the required strengths 70, 80, and 90 kgf/mm$^2$ in SP104 is performed, and then it is analyzed again whether the base material 20 actually meets the strength in SP101.

As described above in detail, in the method for manufacturing the machine component shown in the second embodiment, in SP104, in addition to performing the mechanical working of, for instance, changing the thickness t of the base material 20 based on the analysis result of SP101, by performing the appropriate rough processing depending on the thickness of the base material 20 and changing the overall form of the base material 20 (for example, from the form 20A to the form 20B, and furthermore to the form 20C), the heat treatment form is optimized. That is, in the second embodiment, when the thickness of the impeller material 20 is relatively thick, the relation between the material thickness in the event of the rough-processing form, the cooling rate and the attained strength are previously arranged. Thereby, the optimal form is selected, and the heat treatment in which an amount of deformation is reduced as in the first embodiment can be performed.

Third Embodiment

A third embodiment of the present invention will be described with reference to FIGS. 9A to 9C.

In the aforementioned second embodiment, in SP104, by performing the appropriate rough processing depending on the thickness of the base material 20 and changing the overall form of the base material 20 (from the form 20A to the forms 20B and 20C), the heat treatment form is optimized. In this case, as shown in FIG. 9A, mechanical working (flow path machining) for forming flow paths 21 may be adapted to be performed on the base material 20 (this is defined as a form 20D).

Figure 9A:
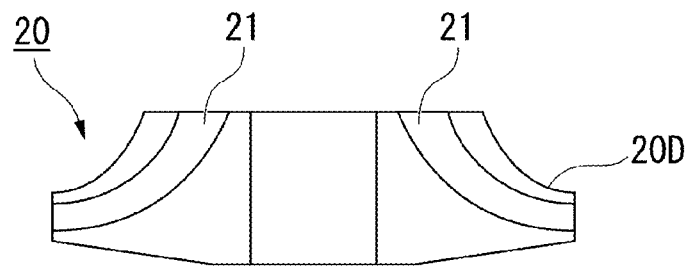
FIG. 9A is a diagram showing a base material which relates to a third embodiment of the present invention and in which flow paths are formed.
Figure 9B:
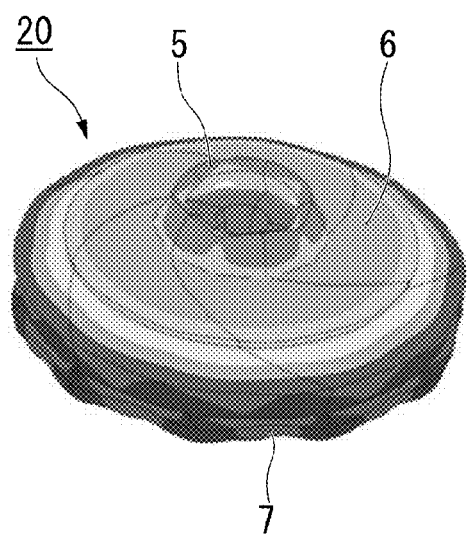
FIG. 9B is a diagram showing the base material relating to the third embodiment of the present invention and showing results of analyzing a degree of deformation after heat treatment of the base material.
Figure 9C:
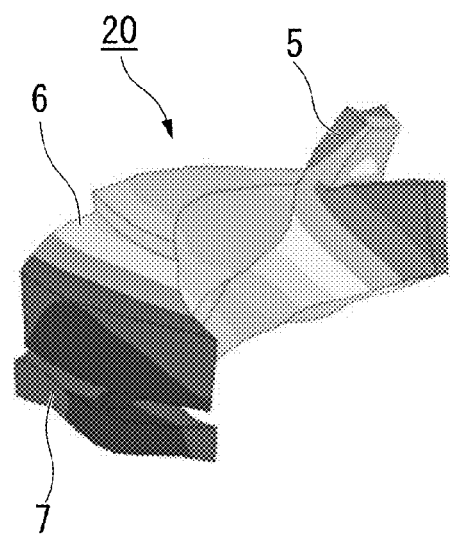
FIG. 9C is a diagram showing the base material relating to the third embodiment of the present invention and showing the results of analyzing the degree of deformation after the heat treatment of the base material.
Figure 10A:
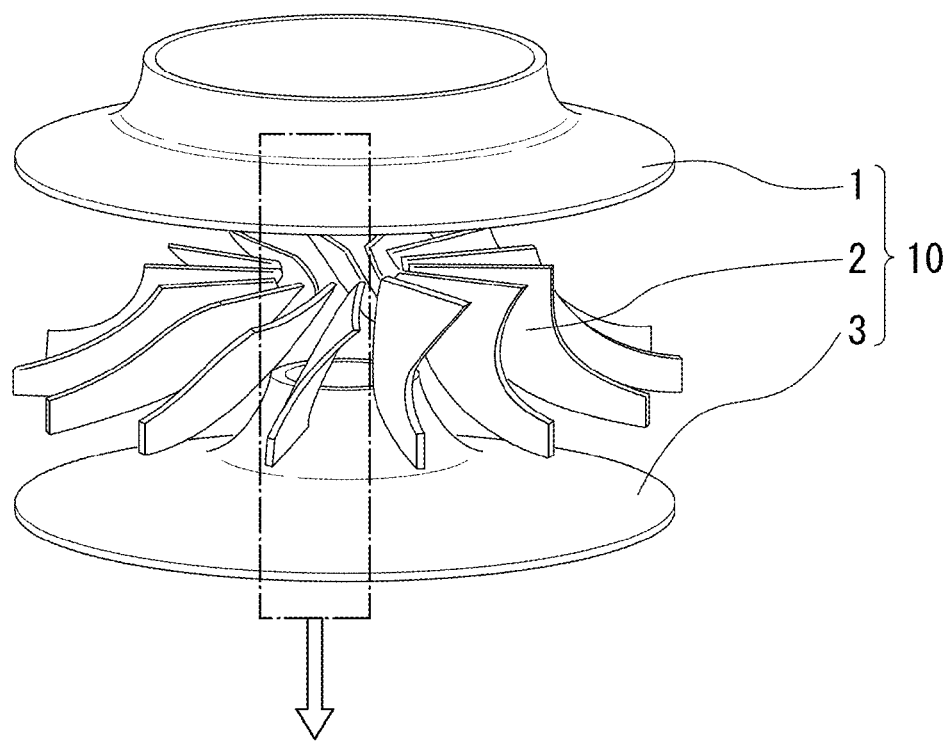
FIG. 10A is an explanatory diagram showing a welded impeller.
Figure 10B:
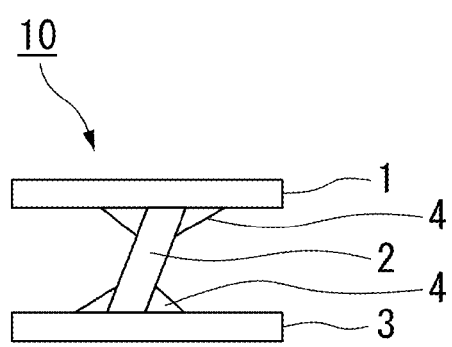
FIG. 10B is an explanatory diagram showing the welded impeller.
Figure 11:
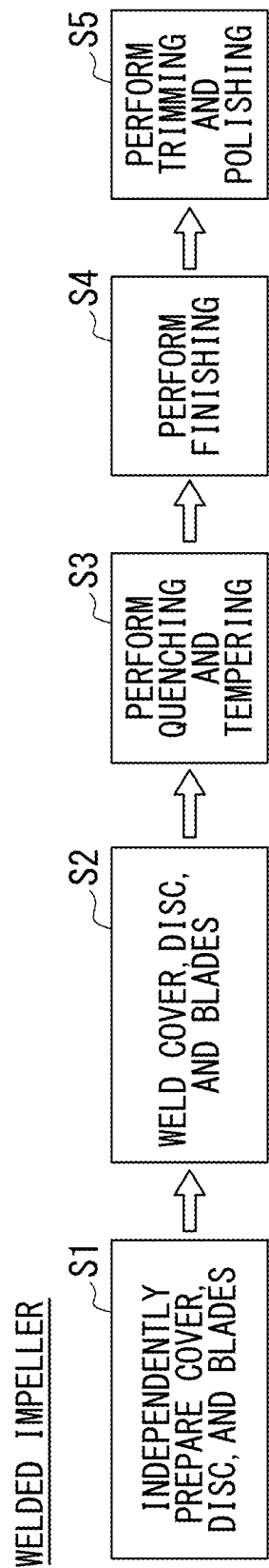
FIG. 11 is a process diagram showing processes of manufacturing the welded impeller.
Figure 12A:
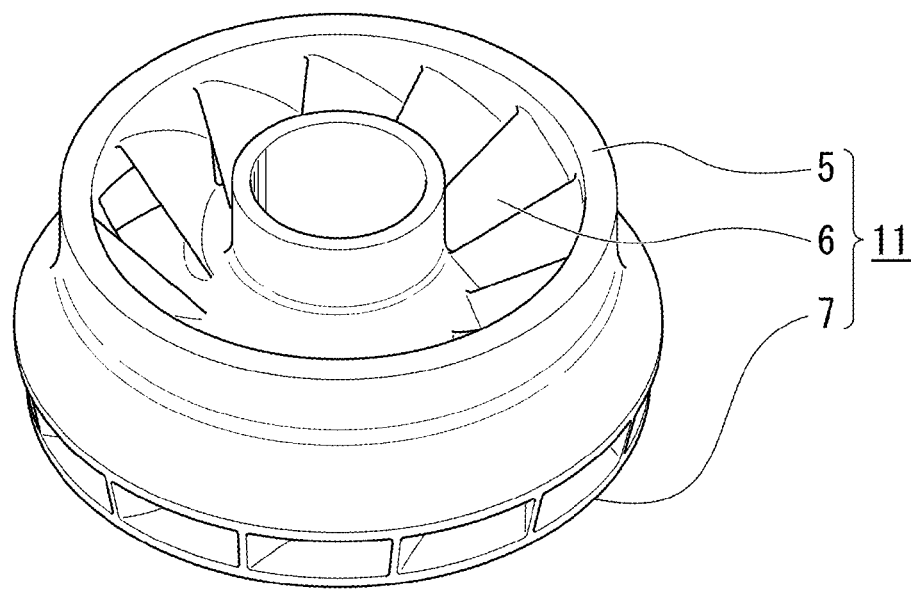
FIG. 12A is an explanatory diagram showing an integrated impeller.
Figure 12B:
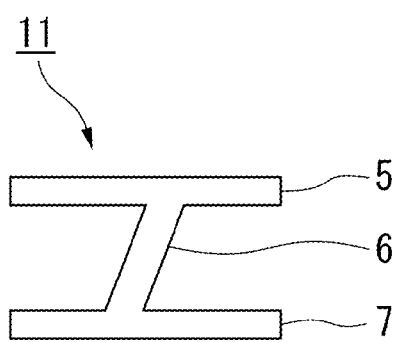
FIG. 12B is an explanatory diagram showing the integrated impeller.
Figure 13:
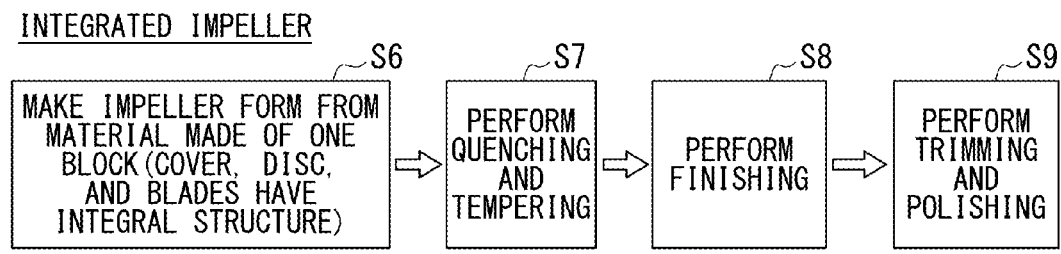
FIG. 13 is a process diagram showing processes of manufacturing the integrated impeller.

Then, even in the case of this form 20D shown in FIG. 9A (heat treatment form), similar to the second embodiment, the required strength in the event of the heat treatment is calculated from analysis results (deformation analysis result example) showing a degree of deformation of the base material 20 shown in FIGS. 9B and 9C after the heat treatment. Further, in this case, the required strength in the event of the heat treatment is calculated in consideration of a relation between the cooling rate and the material thickness of the form 20D as well as a proper wall thickness of the material between the flow paths.

Then, processing of changing a thickness of each blade portion of the form 20D depending on the required strengths 70, 80, and 90 kgf/mm$^2$ in SP104 is performed, and subsequently it is analyzed whether the base material 20 actually meets the strength in SP101.

As described above in detail, in the method for manufacturing the machine component shown in the third embodiment, in SP104, in addition to performing the mechanical working of, for instance, changing the thickness t of the base material 20 based on the analysis result of SP101, by performing the appropriate rough processing depending on the thickness of each portion of the base material 20 and changing the overall form of the base material 20 (from the form 20A to the forms 20B and 20C) and to the form 20D in which the flow paths 21 are formed in the outer surface of the form 20C serving as the base material 20, the heat treatment form is optimized. That is, in the third embodiment, the processing of changing the overall form of the base material 20 (from the form 20A to the forms 20B and 20C) and changing it to the form 20D in which the flow paths 21 are formed in the outer surface of the base material 20 is performed. Thereby, the heat treatment in which an amount of deformation is minimized as in the second embodiment can be performed.

The prediction of the strength of the base material 20 after the heat treatment using the graphs shown in FIGS. 4 to 6 and 8 is one example. If the form of the base material to be evaluated is different, the graphs are different, and the graphs are appropriately replaced depending to the target to be evaluated.

While embodiments of the present invention have been described with reference to the drawings, the specific constitution is not limited to these embodiments and also includes design modification without departing from the gist of the present invention.

INDUSTRIAL APPLICATION

According to the description above, it is determined based on simulation whether or not strength-related data (yield strength, hardness, etc.) predicted from the thickness of a base material such as an impeller material (machine component) meets required specifications, and heat treatment is performed based on results of the determination. Thus, it is possible to minimize deformation of the base material in the event of the heat treatment.

REFERENCE SIGNS LIST 20A to 20D base material (machine component)

What is claimed is:

1. A method for manufacturing a machine component, in which a base material is subjected to a plurality of mechanical working processes and heat treatment processes and is processed into a final form, the method comprising:
   a process of calculating and estimating post-heat-treatment strength for an intermediate form of the base material after one of the mechanical working processes is performed; and
   a process of comparing the estimated strength with reference strength required for the final form,
   wherein, based on a result of the comparison, heat treatment is performed after the one of the mechanical working processes is performed.

2. The method for manufacturing the machine component according to claim 1, wherein finishing is performed after the heat treatment process.

3. The method for manufacturing the machine component according to claim 1, wherein the comparing process includes adjusting a thickness of the base material when the estimated strength does not meet the reference strength required for the final form.

4. The method for manufacturing the machine component according to claim 3, wherein the comparing process includes making the base material in a cylindrical form, in the center of which an opening is formed, when the estimated strength does not meet the reference strength required for the final form.

5. The method for manufacturing the machine component according to claim 4, wherein the comparing process includes forming a cover profile on an outer surface of the base material formed in the cylindrical form when the estimated strength does not meet the reference strength required for the final form.

6. The method for manufacturing the machine component according to claim 5, wherein the comparing process includes forming flow paths in the base material on which the cover profile is formed when the estimated strength does not meet the reference strength required for the final form.

7. The method for manufacturing the machine component according to claim 2, wherein the comparing process includes adjusting a thickness of the base material when the estimated strength does not meet the reference strength required for the final form.

8. The method for manufacturing the machine component according to claim 7, wherein the comparing process includes making the base material in a cylindrical form, in the center of which an opening is formed, when the estimated strength does not meet the reference strength required for the final form.

9. The method for manufacturing the machine component according to claim 8, wherein the comparing process includes forming a cover profile on an outer surface of the base material formed in the cylindrical form when the estimated strength does not meet the reference strength required for the final form.

10. The method for manufacturing the machine component according to claim 9, wherein the comparing process includes forming flow paths in the base material on which the cover profile is formed when the estimated strength does not meet the reference strength required for the final form.

\* \* \* \* \*